United States Patent
Hsu et al.

(10) Patent No.: US 9,756,421 B2
(45) Date of Patent: Sep. 5, 2017

(54) AUDIO REFOCUSING METHODS AND ELECTRONIC DEVICES UTILIZING THE SAME

(71) Applicant: MediaTek Inc., Hsin-Chu (TW)

(72) Inventors: Chao-Ling Hsu, Hsinchu (TW); Yiou-Wen Cheng, Hsinchu (TW); Liang-Che Sun, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/003,954

(22) Filed: Jan. 22, 2016

(65) Prior Publication Data
US 2017/0215005 A1    Jul. 27, 2017

(51) Int. Cl.
H04R 3/00    (2006.01)
G06F 3/16    (2006.01)
G06T 7/20    (2017.01)

(52) U.S. Cl.
CPC ............ *H04R 3/005* (2013.01); *G06F 3/162* (2013.01); *G06F 3/165* (2013.01); *G06T 7/2033* (2013.01); *H04R 2430/25* (2013.01)

(58) Field of Classification Search
CPC ..... H04R 3/005; H04R 2430/25; G06F 3/162; G06F 3/165; G06T 7/2033
See application file for complete search history.

(56) References Cited

U.S. PATENT DOCUMENTS

| | | | | |
|---|---|---|---|---|
| 9,066,065 B2* | 6/2015 | Ikeda | ...... | H04N 5/91 |
| 2003/0072461 A1* | 4/2003 | Moorer | ...... | H04R 1/406 |
| | | | | 381/92 |
| 2011/0085061 A1* | 4/2011 | Kim | ...... | H04N 5/232 |
| | | | | 348/240.99 |
| 2011/0164769 A1* | 7/2011 | Zhan | ...... | G10L 19/008 |
| | | | | 381/307 |
| 2014/0029761 A1* | 1/2014 | Maenpaa | ...... | H04R 3/005 |
| | | | | 381/92 |
| 2014/0086551 A1* | 3/2014 | Kaneko | ...... | H04N 5/2173 |
| | | | | 386/230 |
| 2015/0078581 A1* | 3/2015 | Etter | ...... | H04R 3/005 |
| | | | | 381/92 |
| 2015/0296319 A1* | 10/2015 | Shenoy | ...... | H04S 7/302 |
| | | | | 381/303 |
| 2015/0312662 A1* | 10/2015 | Kishimoto | ...... | H04R 3/005 |
| | | | | 381/92 |

OTHER PUBLICATIONS

Cameron Faulkner: "How the Snapdragon 810 is going to change smartphones"; Dec. 12, 2014; www.techradar.com/news; pp. 1-11.
"Using Audio Zoom"—LG G2_1 (printed from website on Jan. 19, 2016); pp. 1-61.

* cited by examiner

*Primary Examiner* — Brenda Bernardi
(74) *Attorney, Agent, or Firm* — McClure, Qualey & Rodack, LLP

(57) ABSTRACT

An audio refocusing method includes receiving an indication signal indicating which sound source in a recorded signal has to be refocused on; determining a direction of the sound source or a location of the sound source; and enhancing sound generated by the sound source in the recorded signal according to the direction or the location of the sound source to generate a processed signal.

25 Claims, 8 Drawing Sheets

AUDIO REFOCUSING METHODS AND ELECTRONIC DEVICES UTILIZING THE SAME

BACKGROUND OF THE INVENTION

Field of the Invention

The invention relates to audio refocusing methods.

Description of the Related Art

In recent years, a camera provided with a group of micro lenses having different focal lengths (micro lens array) and an image pickup device having high resolution, called a light field (registered trademark) camera, is known. An image that focuses on an arbitrary position can be reconstructed when the image is reproduced by using image data obtained from one-time capturing by this type of camera.

As an image-refocusing on any arbitrary position can be reconstructed, how to refocus on any sound source in an audio signal is an interesting topic of concern.

BRIEF SUMMARY OF THE INVENTION

Electronic devices and audio refocusing methods are provided. An exemplary embodiment of an electronic device comprises an interface, a transmitting device, a receiving device and a play device. The interface generates an indication signal indicating which sound source in a recorded signal has to be refocused on. The transmitting device transmits the indication to a processor. The receiving device receives a processed signal, wherein the processor enhances a sound generated by the sound source in the recorded signal to generate the processed signal. The play device plays the recorded signal and/or the processed signal.

An exemplary embodiment of an electronic device comprises an interface and a processor. The processor receives an indication signal and a recorded signal in which a sound source has to be refocused on through the interface, determines a direction of the sound source or a location of the sound source, and enhances sound generated by the sound source in the recorded signal according to the direction or the location of the sound source to generate a processed signal, such that a play device plays the recorded signal and/or the processed signal.

An exemplary embodiment of an audio refocusing method comprises: receiving an indication signal indicating which sound source in a recorded signal has to be refocused on; determining a direction of the sound source or a location of the sound source; and enhancing sound generated by the sound source in the recorded signal according to the direction or the location of the sound source to generate a processed signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
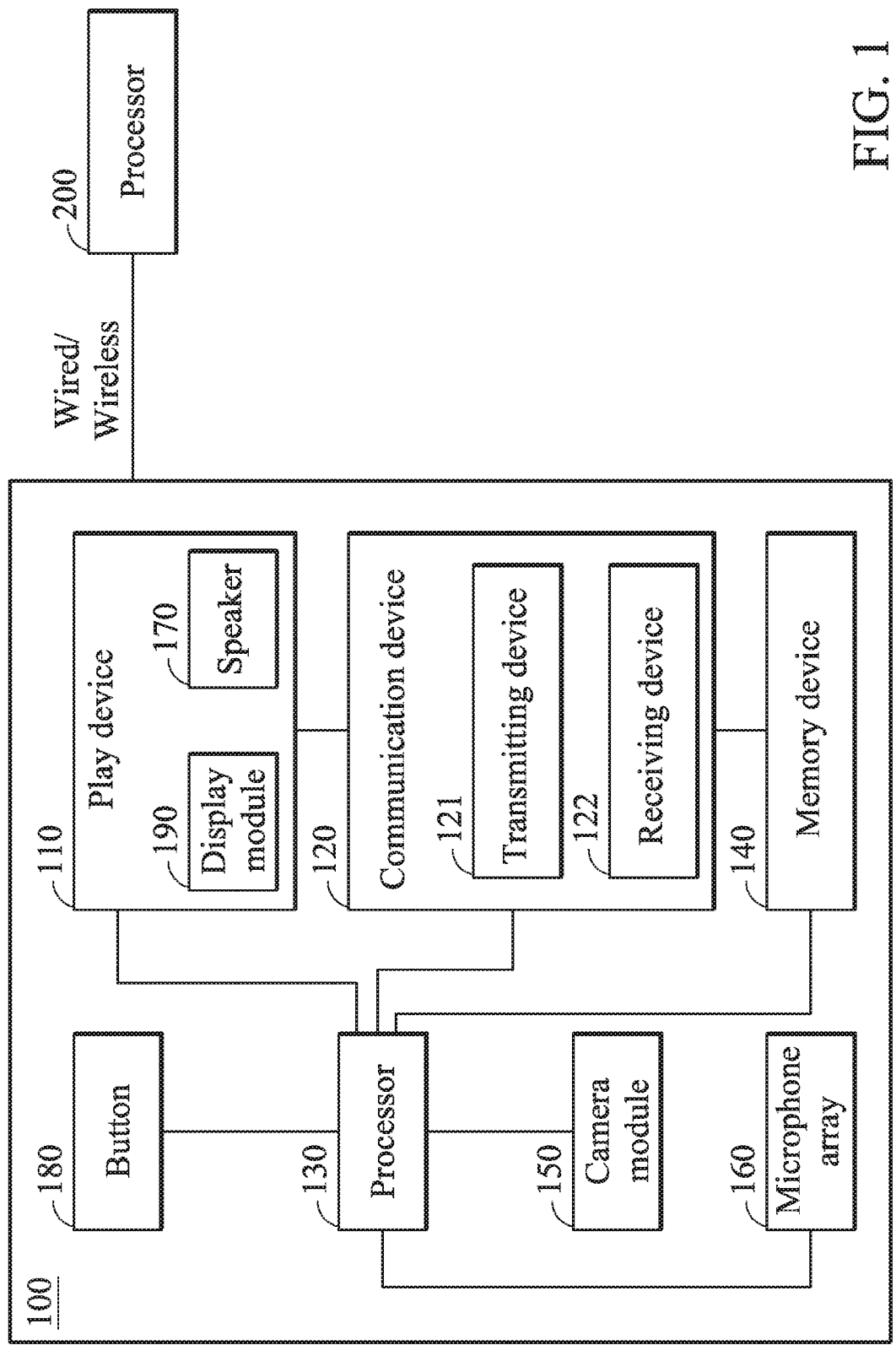
FIG. 1 is an exemplary block diagram of an electronic device according to an embodiment of the invention.

FIG. 1 is an exemplary block diagram of an electronic device according to an embodiment of the invention. The electronic device 100 may at least comprise a play device 110, a communication device 120, a processor 130 and a memory device 140. The play device 110 may comprise at least one of a display module 190 and a speaker. The display module 190 may comprise a panel, a touch panel or any other type of display module to display image or video data. The speaker 170 is utilized for playing an audio signal or an audio portion of the multimedia signal. The communication device 120 may comprise a transmitting device 121 and a receiving device 122. The communication device 120 may be a wireless communication device capable of transmitting wireless signals via the transmitting device 121 and receiving wireless signals via the receiving device 122, or a wired communication device with the transmitting device 121 and the receiving device 122 implemented as an output port and an input port to transmit and receive signals via a transmission line coupled thereto. The memory device 140 stores system data, such as the image data or the video data as discussed above. The communication device 120 may also be implemented as a communication device capable of transmitting and receiving both wired and wireless signals via the transmitting device 121 and the receiving device 122, and the invention should not be limited to any specific implementation method. The processor 130 may control the operation of the play device 110, the communication device 120 and the memory device 140.

According to another embodiment of the invention, the electronic device 100 may also comprise a camera module 150. The camera module 150 is capable of capturing images with depth information and recording the captured images and the corresponding depth information in the memory device 140. In the embodiments of the invention, the camera module 150 may comprise a plurality of cameras, or may comprise at least a depth camera, or may comprise at least stereo cameras, or the like. The processor 130 may also control the operation of the camera module 150.

According to another embodiment of the invention, the electronic device 100 may also comprise a microphone array 160. The microphone array 160 is capable of capturing and recording images with multiple channels. In the embodiments of the invention, the microphone array 160 may comprise N microphones, wherein N is a positive integer greater than 1. The processor 130 may also control the operation of the microphone array 160.

Figure 2C:
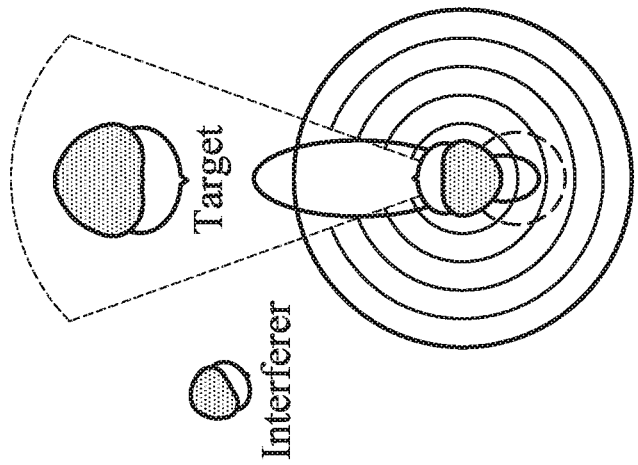
FIG. 2C shows an equivalent receiving beam after post-processing according to an embodiment of the invention.
Figure 2B:
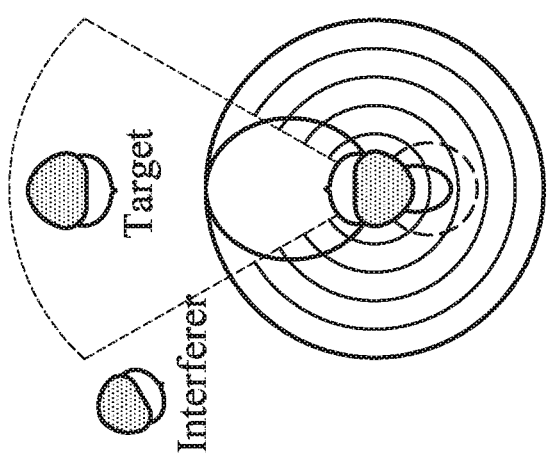
FIG. 2B shows another exemplary receiving beam of a microphone.
Figure 2A:
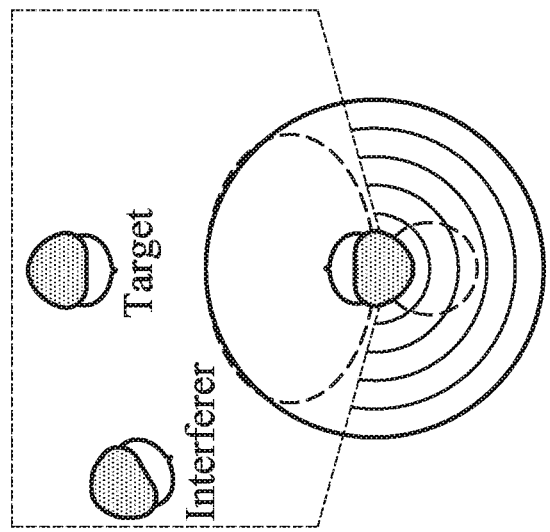
FIG. 2A shows an exemplary receiving beam of a microphone.

FIG. 2A and FIG. 2B respectively show different receiving beams of a microphone (or a microphone array). As shown in FIG. 2A, the coverage area of the receiving beam is too wide so that the sound generated by an interfering sound source adjacent to the target sound source will also be captured by the microphone. For a microphone (or a microphone array) with better directionality, the coverage area of the receiving beam can be narrower in order to not capture the sound generated by the interfering sound source, as shown in FIG. 2B.

Unlike focusing on the target sound source via the microphone (or a microphone array) when recording, in the embodiments of the invention, methods and electronic devices for refocusing on any target sound source in a recorded audio signal are proposed. The equivalent receiving beam of the microphone (or a microphone array) after post-processing the recorded audio signal for refocusing on a target sound source is shown in FIG. 2C. Compared to FIG. 2A and FIG. 2B, by post-processing the recorded audio signal, the power of the receiving beam can be more focused on the target sound source. Therefore, the sound generated by the target sound source in the processed signal is enhanced further, compared to FIG. 2A and FIG. 2B.

According to a first embodiment of the invention, the electronic device 100 may provide an interface for a user to select a sound source in a recorded signal to be refocused on. The recorded signal may be an audio signal or a multimedia signal and may be displayed or played via the play device 110 or the speaker 170, for the user to view or listen to the recorded signal when selecting the sound source to be refocused on.

Figure 3:
FIG. 3 shows an exemplary operation for a user to select a sound source to be refocused on according to an embodiment of the invention.

In the embodiments of the invention, the interface may be a touch panel comprised in the play device 110 or a button 180 as shown in FIG. 1. In an example, when the play device 110 comprising a touch panel is playing the recorded signal, which is a multimedia signal, the user may select the sound source to be refocused on by touching the position of the image of the sound source, such as the operation on the sound source 301 shown in FIG. 3, to generate an indication signal via the touch panel. In another example, when the speaker 170 is playing the recorded signal, such as playing an audio signal or the audio portion of a multimedia signal, the user may select the sound source to be refocused on by pressing the button 180 when the sound of the sound source is being played, so as to tag the sound source to be refocused on and generate an indication signal via the button 180. In the embodiments of the invention, the indication signal may carry information indicating which sound source in the recorded signal is selected by the user to be refocused on.

In the first embodiment of the invention, the transmitting device 121 may transmit the indication signal to a processor outside of the electronic device 100, such as the processor 200, in a wired or a wireless manner. According to the embodiments of the invention, the processor 200 may be configured in another electronic device, such as a cloud server, for example. Note that, in the embodiments of the invention, the recorded signal may be stored in the memory device 140, or it may be stored in an external memory device coupled to the processor 200, or stored in a cloud server and accessed by the electronic device 100. Therefore, the invention should not be limited to any specific implementation method.

The processor 200 may also receive the recorded signal (for example, from the electronic device 100, the external memory device or the cloud server as discussed above), determine the direction of the selected sound source or the location of the selected sound source, and enhance the sound generated by the selected sound source according to the direction or the location of the selected sound source to generate a processed signal.

The receiving device 122 may receive the processed signal from the processor 200. The processed signal may then be displayed or played via the play device 110 or the speaker 170, for example, in response to a display or play request input by a user.

According to a second embodiment of the invention, the transmitting device 121 may transmit the indication signal to the processor 130 inside of the electronic device 100. The processor 130 may also receive the recorded signal (for example, from the memory device 140, the external memory device or the cloud server as discussed above), determine the direction of the selected sound source or the location of the selected sound source, and enhance the sound generated by the selected sound source according to the direction or the location of the selected sound source to generate a processed signal. The receiving device 122 may receive the processed signal from the processor 130. The processed signal may then be provided to the play device 110 or the speaker 170 to be displayed or played via the play device 110 or the speaker 170 in response to a display or play request input by a user.

According to an embodiment of the invention, the recorded signal may be an audio signal or a multimedia signal, and the audio signal or an audio portion of the multimedia signal is captured by a microphone array comprising N microphones and capturing sounds in N channels, wherein N is a positive integer and is greater than 1. In an example that is not intended to be a limitation of the present invention, the microphone array for capturing the audio signal or the audio portion of the multimedia signal may be the microphone array 160 of the electronic device 100. The microphone array for capturing the audio signal or the audio portion of the multimedia signal may also be another microphone array not comprised in the electronic device 100, and the invention should not be limited thereto.

According to an embodiment of the invention, information regarding the sounds captured in the N channels is all preserved in the recorded signal. In an example, full data of the sounds captured in the N channels are all preserved in the recorded signal. In another example, the data of the sounds captured in the N channels may be encoded or compressed so that information regarding the sounds captured in the N channels is all preserved in the recorded signal but the data size can be reduced. As long as the information regarding the sounds captured in the N channels is preserved in the recorded signal, the sounds captured in the N channels can be reconstructed based on the information stored in the recorded signal, therefore, audio refocus can be achieved. Details of the audio refocusing method are discussed further in the following paragraphs.

Figure 4:
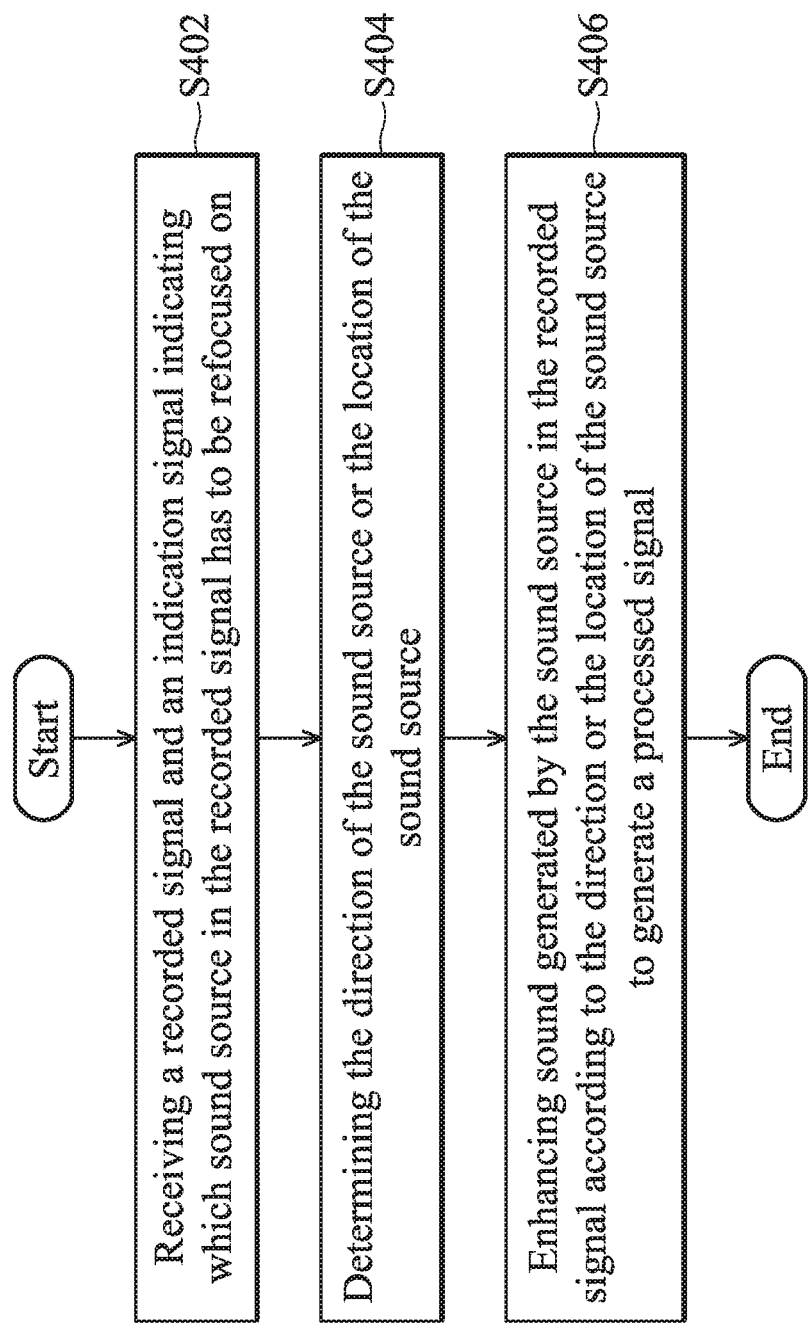
FIG. 4 shows a flow chart of an audio refocusing method according to an embodiment of the invention.

FIG. 4 shows a flow chart of an audio refocusing method according to an embodiment of the invention. First of all, the processor (e.g. the processor 130 or 200) may receive a recorded signal and an indication signal indicating which sound source in the recorded signal has to be refocused on (Step S402). Next, the processor may determine the direction of the sound source or the location of the sound source according to the indication signal indicating which sound source in the recorded signal has to be refocused on (Step S404). Finally, the processor may enhance sound generated by the sound source in the recorded signal according to the direction or the location of the sound source to generate a processed signal (Step S406).

According to an embodiment of the invention, the processor (e.g. the processor 130 or 200) may determine whether to enhance the sound generated by the selected sound source according to the direction or the location of the selected sound source according to the distance from the microphone array, which captures the sounds in the recorded signal, to the selected sound source. The processor may determine whether the distance is greater than a predetermined value.

Figure 5:
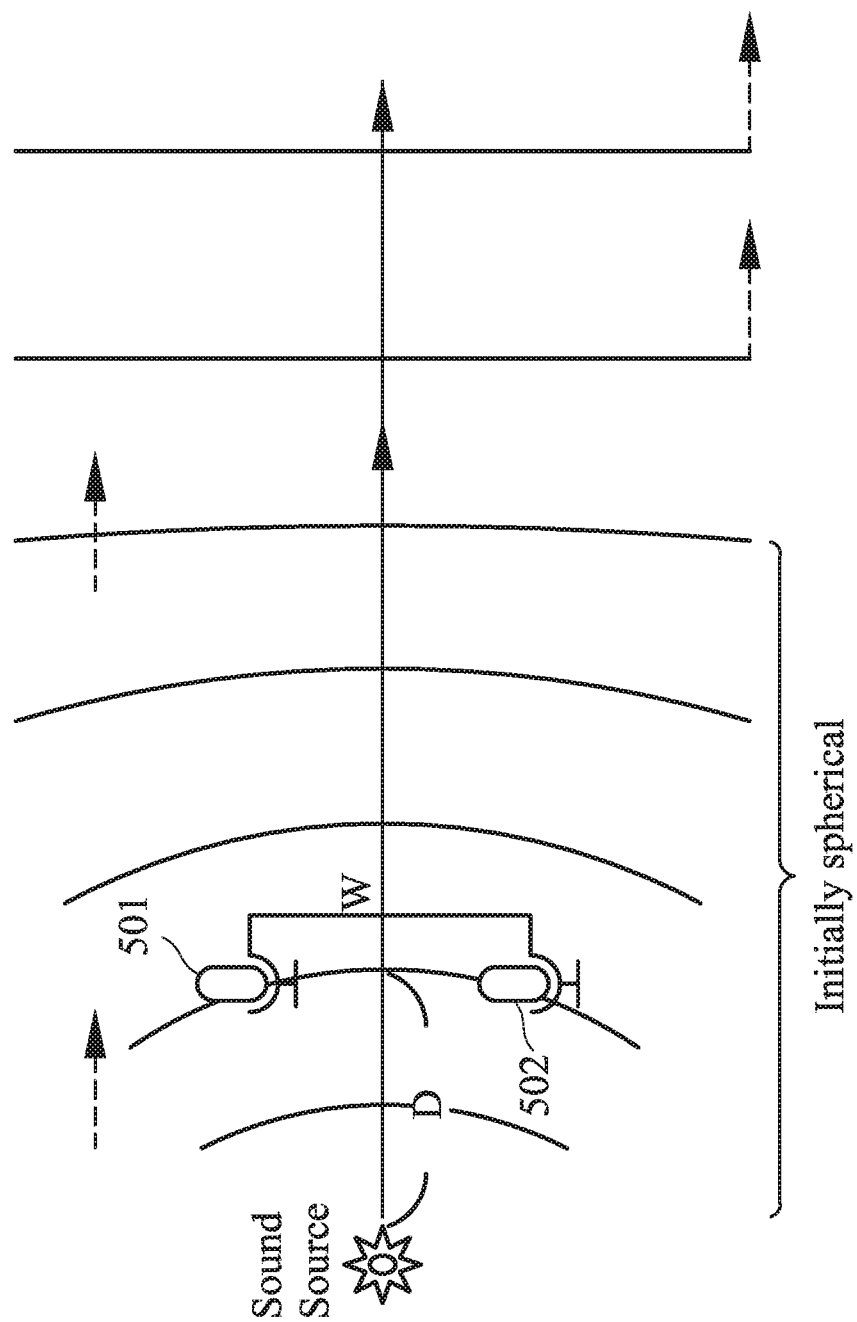
FIG. 5 is an exemplary diagram showing the sound waves according to an embodiment of the invention.

FIG. 5 is an exemplary diagram showing the sound waves according to an embodiment of the invention. In FIG. 5, D stands for the distance from the microphone array (for example, taking a central point of the microphones 501 and 502 to represent the position of the microphone array) to the sound source and W stands for the maximum width of the microphone array (for example, from the microphone 501 to the microphone 502 if the distance between the microphone 501 and the microphone 502 is the furthest among any two microphones of the microphone array). When the distance D is not greater than a predetermined value (which may indicate that the shape of the sound wave is spherical), the processor enhances the sound according to the location of the sound source. When the distance D is greater than the predetermined value (which may indicate that the shape of the sound wave is planar), the processor enhances the sound according to the direction of the sound source. In an embodiment of the invention, the predetermined value may be set to 20*W.

According to an embodiment of the invention, the processor may determine the direction or the location of the selected sound source by analyzing an acoustic feature of the selected sound source or an image of the selected sound source.

In the sound-based approach, an acoustic feature of the selected sound source may first be identified by the processor. For example, the speaker identification technology can be applied. When the acoustic feature of the selected sound source is identified, the processor may analyze the recorded signal according to the acoustic feature of the selected sound source to derive timing difference for N microphones to receive the sound generated by the selected sound source, and then derive the direction, the location, the 3-D coordinates or any other information related to the direction or the location of the selected sound source, for example, in the real world according to the timing difference.

Note that, in some embodiments of the invention, ultrasound may also be used to determine the direction or the location of the selected sound source. For example, the multiple ultrasound transducers may be used to detect the depth of the selected sound source.

Figure 6:
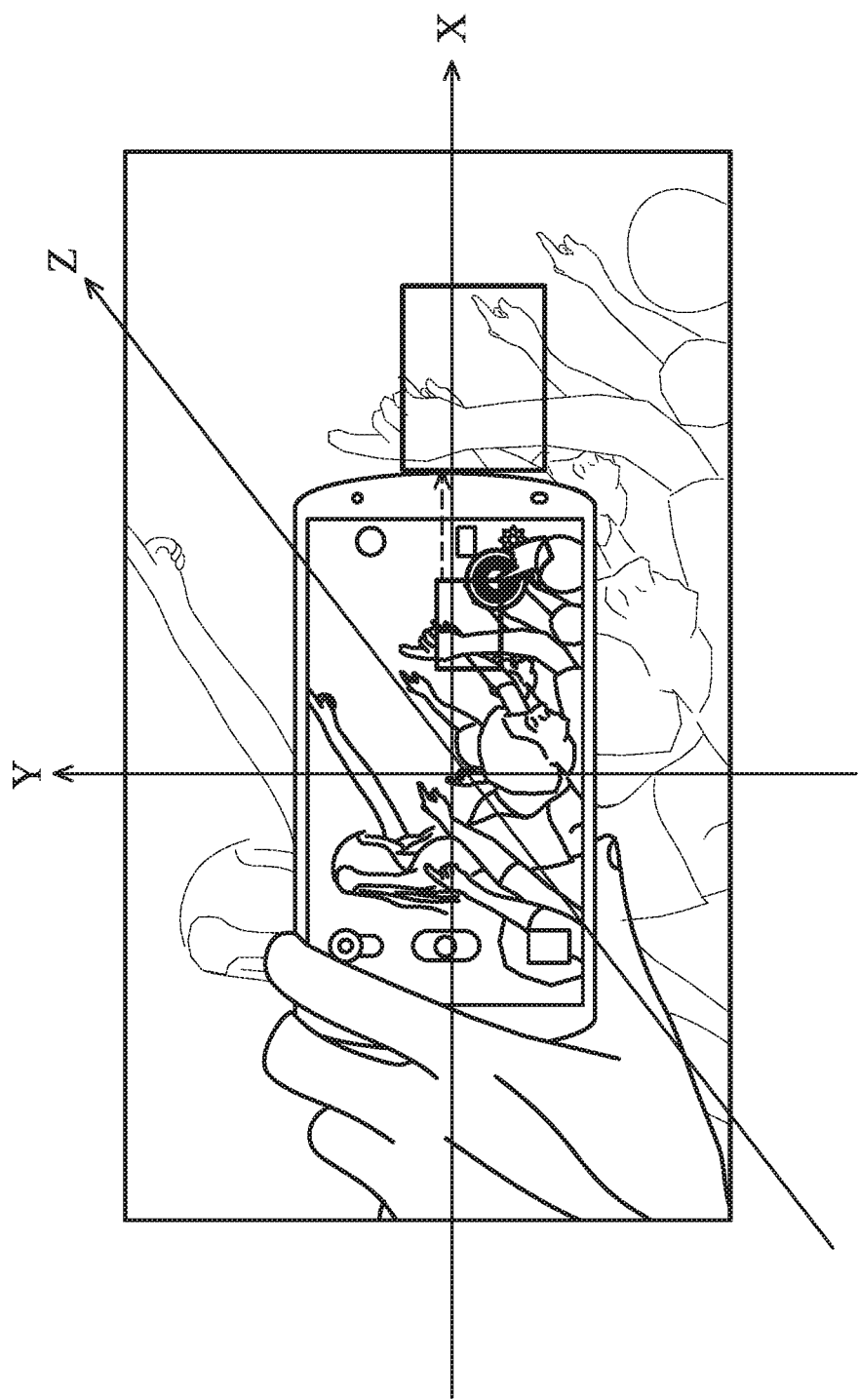
FIG. 6 is a schematic diagram showing a concept of determining the 3-D coordinates of the sound source in the real world according to an embodiment of the invention.

In the image-based approach, the processor may analyze the image of the selected sound source according to the pixel index and depth information regarding the selected sound source. For example, the pixel index may be obtained according to the position tapped by the user to select the sound source, and the depth information may be obtained from the camera module as discussed above. When the pixel index or depth information of the selected sound source is obtained, the processor may then derive the direction, the location, the 3-D coordinates or any other information related to the direction or the location of the selected sound source, for example, in the real world according to the pixel index and depth information, as shown in the exemplary diagram in FIG. 6.

Note that, in the embodiments of the invention, the direction of the selected sound source may refer to the direction from the microphone array capturing the recorded signal to the selected sound source. Note further that, in the embodiments of the invention, the 3-D coordinates may be defined by taking the microphone array capturing the recorded signal as an origin point, the horizontal as the X-axis, the vertical as the Y-axis, and depth (that is, the distance from the microphone array to the selected sound source) as the Z-axis, as the exemplary diagram shown in FIG. 6.

Note further that the processor may also determine the direction or the location of the selected sound source by using a combination of the sound-based approach and the image-based approach, and the invention should not be limited to any specific implementation method.

According to an embodiment of the invention, when the selected sound source is a moving object, the processor further tracks a movement of the selected sound source according to a tracking signal received from the interface, an acoustic feature of the selected sound source or an image of the selected sound source. In the embodiments of the invention, the object tracking may be done manually or automatically. Accordingly, the sound generated by the moving sound source can be enhanced during the movement.

In an embodiment of the invention, the tracking signal may be generated by the interface. For example, the user may keep tapping on the touch panel by his finger on the images of the selected sound source in multiple frames played sequentially to generate a tracking signal or signals. The movement of the selected sound source can be tracked manually according to the positions of the finger tapping on the touch panel.

In another embodiment of the invention, the movement of the selected sound source can be tracked automatically based on the sound-based approach discussed above. For example, speaker-identification technology can be applied.

In yet another embodiment of the invention, the movement of the selected sound source can be tracked automatically based on the image-based approach discussed above. For example, object-recognition or facial-recognition technology can be applied.

In still another embodiment of the invention, the movement of the selected sound source can be tracked automatically based on a combination of the sound-based approach and the image-based approach discussed above.

According to an embodiment of the invention, the processor may enhance the sound generated by the selected sound source by determining timing differences for N microphones to receive the sound generated by the selected sound source according to the direction or the location of the sound source, adjusts sounds respectively captured by the N microphones in the recorded signal according to the timing differences and sum up the adjusted sounds to generate the processed signal. According to an embodiment of the invention, the adjusting step is to adjust timing of sounds by delaying, aligning, advancing or any other operation to adjust timing of sounds. For example, the processor may delay the sounds so that the sounds from the selected sound source respectively captured by the N microphone in N-channels are aligned. In this manner, when summing up the delayed sounds, an amplitude or power of the sound generated by the selected sound source in the processed signal can be strengthened.

Figure 7:
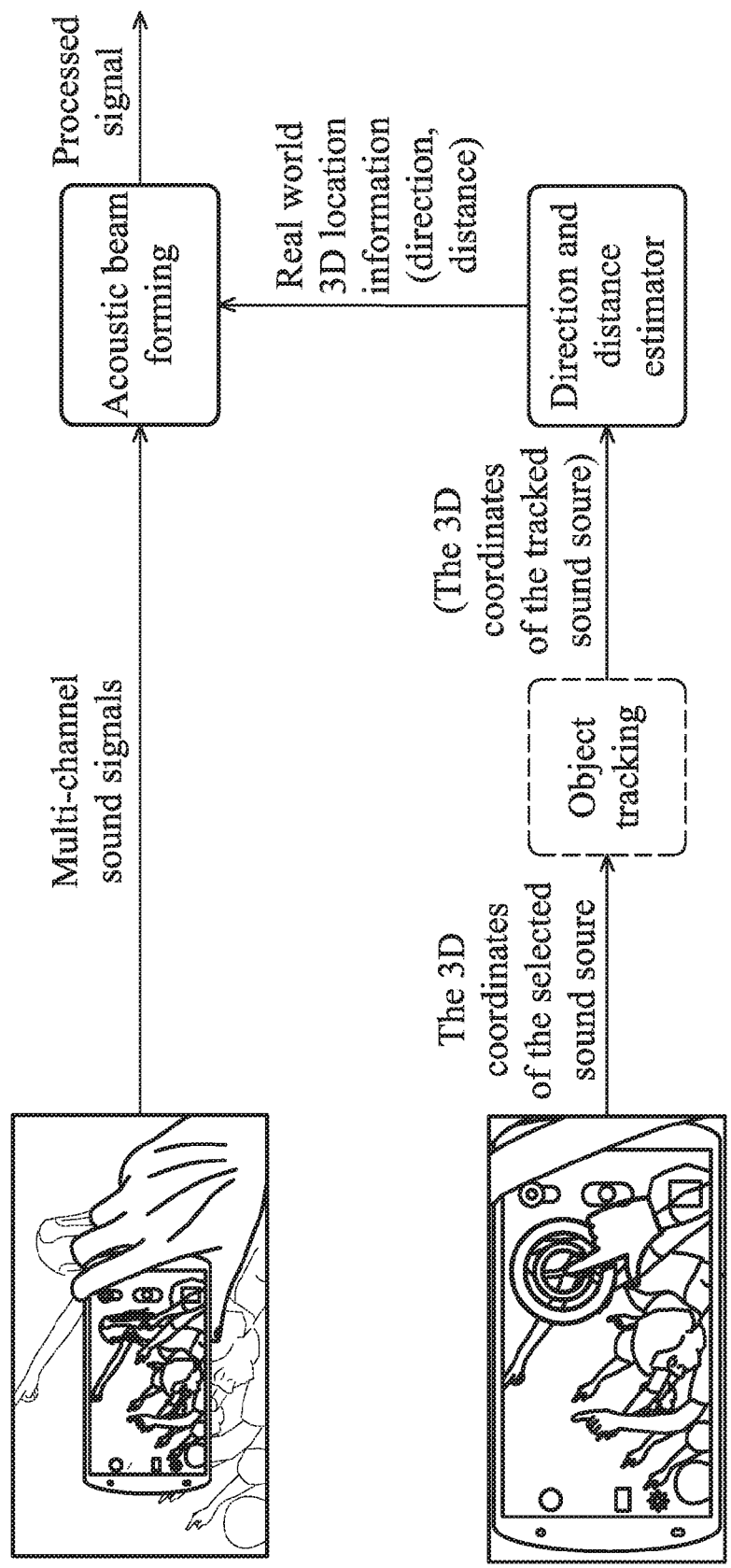
FIG. 7 shows an exemplary audio refocusing flow according to an embodiment of the invention.

FIG. 7 shows an exemplary audio refocusing flow according to an embodiment of the invention. In this embodiment, the recorded signal is a multimedia signal recorded by a mobile device with a microphone array. Information in the multi-channel sound signals is all preserved and will be provided for performing audio refocusing (or acoustic beam forming). The user may select a sound source for the recorded signal to refocus on by tapping on the touch panel on the image of the sound source. The 3D coordinates of the selected sound source is provided by analyzing the image data at the tapped position on the touch panel. Object tracking may also be required when the selected sound source is a moving object. Information regarding the 3D coordinates of the selected sound source is also provided to a direction- and distance-estimator to estimate the 3D location (that is, the direction, the distance, and/or the coordinates) of the selected sound source, for example, in the real world. After performing audio refocusing (or acoustic beam forming) according to the direction or 3D location information, the processed signal is refocused on the sound generated by the selected sound source.

Figure 8:
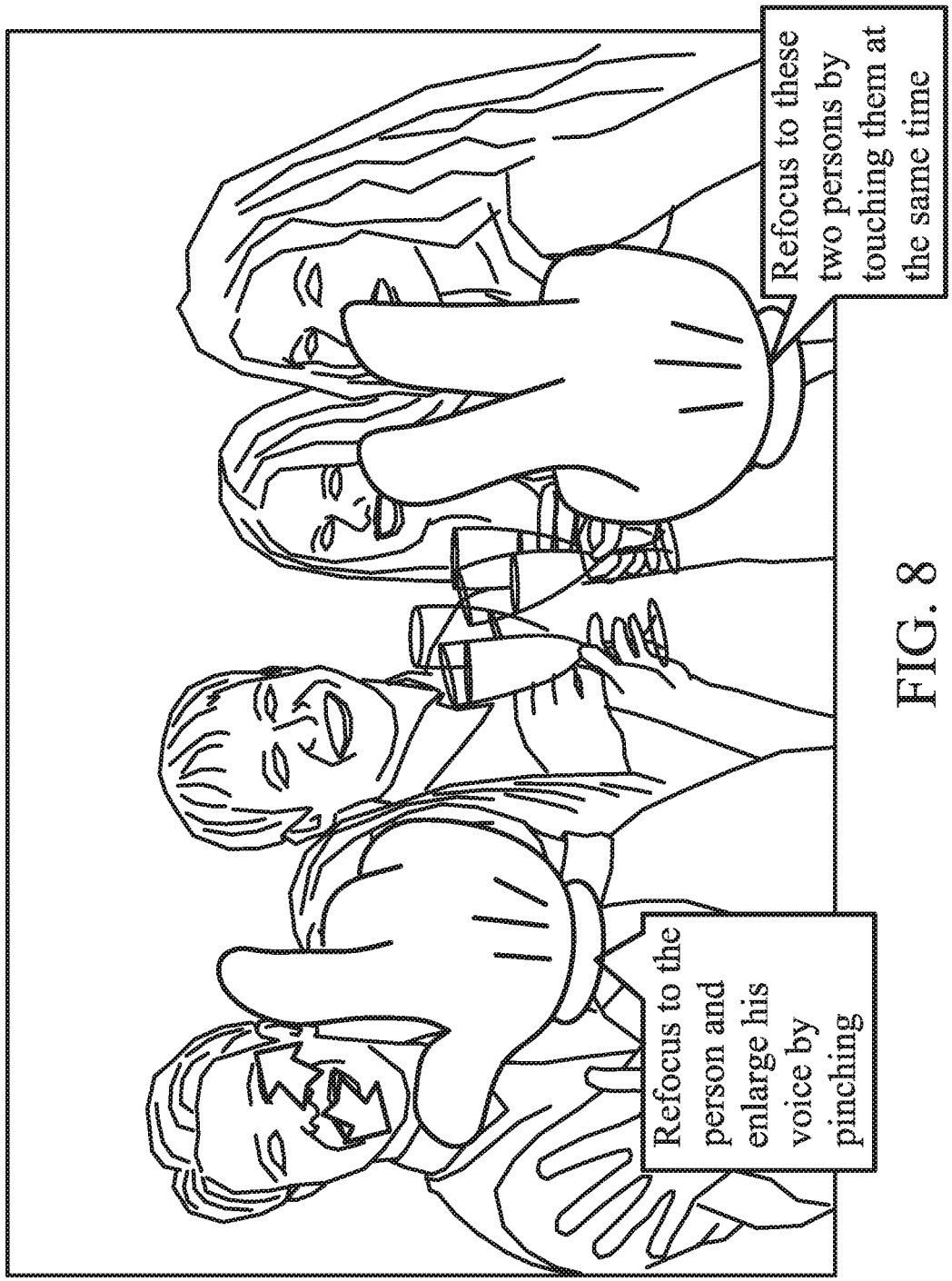
FIG. 8 shows an exemplary operation for a user to select more than one sound source to be refocused on according to an embodiment of the invention.

In the embodiments of the invention, by post-processing the recorded signal, the user can choose any target sound source that he/she wants to enhance, and the processed signal is refocused on the sound generated by the target sound source. In addition, the processed signal can refocus on more than one object. For example, as shown in FIG. 8, the user may direct an electronic device to refocus on the voice of a person by pinching on the image of the person that he/she is interested in, or he/she may direct the electronic device to refocus on the voices of multiple persons using, for example, a multi-touch operation on the people that he/she is interested in (that is, by touching the panel with multiple fingers at the same time) or any other operation for selecting multiple persons.

By applying the audio refocusing method as discussed above, the quality of the post-processing beam forming result is better than a real-time beam forming processing.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
an interface, generating an indication signal indicating which sound source in a recorded signal has to be refocused on;
a transmitting device, transmitting the indication to a processor;
a receiving device, receiving a processed signal, wherein the processor enhances a sound generated by the sound source in the recorded signal to generate the processed signal; and
a play device, playing the recorded signal and/or the processed signal,
wherein the recorded signal is a multimedia signal comprising an image portion and an audio portion,
wherein the generation of the processed signal includes refocusing the audio portion of the sound source in the multimedia signal without referring to refocus result of the image portion of the sound source.

2. The electronic device as claimed in claim 1, wherein the recorded signal is an audio signal or a multimedia signal, and wherein the audio signal or an audio portion of the multimedia signal is captured by a microphone array comprising N microphones, wherein N is a positive integer and is greater than 1.

3. The electronic device as claimed in claim 2, wherein the microphone array captures sounds in N channels, and wherein information regarding the sounds captured in the N channels are all preserved in the recorded signal.

4. The electronic device as claimed in claim 1, further comprising:
the processor, receiving the indication signal and the recorded signal, determining a direction of the sound source or a location of the sound source, and enhancing the sound generated by the sound source according to the direction or the location of the sound source to generate the processed signal.

5. The electronic device as claimed in claim 1,
wherein the processor receives the indication signal and the recorded signal, determines a direction of the sound source or a location of the sound source, and enhances the sound generated by the sound source according to the direction or the location of the sound source to generate the processed signal,
wherein the processor determines the direction or the location of the sound source by analyzing an acoustic feature of the sound source or an image of the sound source.

6. The electronic device as claimed in claim 1,
wherein the processor receives the indication signal and the recorded signal, determines a direction of the sound source or a location of the sound source, and enhances the sound generated by the sound source according to the direction or the location of the sound source to generate the processed signal,
wherein when the sound source is a moving object, the processor further tracks a movement of the sound source according to a tracking signal received from the interface, an acoustic feature of the sound source or an image of the sound source.

7. The electronic device as claimed in claim 1,
wherein the processor receives the indication signal and the recorded signal, determines a direction of the sound source or a location of the sound source, and enhances the sound generated by the sound source according to the direction or the location of the sound source to generate the processed signal,
wherein the processor enhances the sound generated by the sound source by determining timing differences for N microphones to receive the sound generated by the sound source according to the direction or the location of the sound source, adjusting sounds respectively captured by the N microphones in the recorded signal according to the timing differences and summing up the adjusted sounds to generate the processed signal.

8. The electronic device as claimed in claim 1,
wherein the processor receives the indication signal and the recorded signal, determines a direction of the sound source or a location of the sound source, and enhances the sound generated by the sound source according to the direction or the location of the sound source to generate the processed signal,
wherein the processor further determines whether a distance from a microphone array to the sound source is greater than a predetermined value, when the distance is greater than the predetermined value, the processor enhances the sound according to the direction of the sound source, and when the distance is not greater than the predetermined value, the processor enhances the sound according to the location of the sound source.

9. The electronic device as claimed in claim 1, wherein the interface is a touch panel or a button.

10. The electronic device as claimed in claim 1, wherein the processor further determines a 3-D coordinate of the sound source in the real world, and the processor enhances the sound generated by the sound source in the recorded signal according to the 3-D coordinate of the sound source to generate the processed signal, and wherein the 3-D coordinate of the sound source is defined by taking a microphone array as an origin point, the horizontal as the X-axis and the vertical as the Y-axis.

11. An electronic device, comprising:
a processor, receiving an indication signal and a recorded signal in which a sound source has to be refocused on, determining a direction of the sound source or a location of the sound source, and enhancing a sound generated by the sound source in the recorded signal according to the direction or the location of the sound source to generate a processed signal, such that a play device playing the recorded signal and/or the processed signal,
wherein the recorded signal is a multimedia signal comprising an image portion and an audio portion,
wherein generation of the processed signal includes refocusing the audio portion of the sound source in the multimedia signal without referring to refocus result of the image portion of the sound source.

12. The electronic device as claimed in claim 11, wherein the recorded signal is an audio signal or a multimedia signal, and wherein the audio signal or an audio portion of the multimedia signal is captured by a microphone array comprising N microphones, wherein N is a positive integer and is greater than 1.

13. The electronic device as claimed in claim 12, wherein the microphone array captures sounds in N channels, and wherein information regarding the sounds captured in the N channels are all preserved in the recorded signal.

14. The electronic device as claimed in claim 11, wherein the processor determines the direction or the location of the sound source by analyzing an acoustic feature of the sound source or an image of the sound source.

15. The electronic device as claimed in claim 11, further comprising:
an interface,
wherein when the sound source is a moving object, the processor further tracks a movement of the sound source according to a tracking signal received from the interface, an acoustic feature of the sound source or an image of the sound source.

16. The electronic device as claimed in claim 12, wherein the processor enhances the sound generated by the sound source by determining timing differences for the N microphones to receive the sound generated by the sound source according to the direction or the location of the sound source, adjusting sounds captured by the N microphones in the recorded signal according to the timing differences and summing up the adjusted sounds to generate the processed signal.

17. The electronic device as claimed in claim 12, wherein the processor further determines whether a distance from the microphone array to the sound source is greater than a predetermined value, when the distance is greater than the predetermined value, the processor enhances the sound according to the direction of the sound source, and when the distance is not greater than the predetermined value, the processor enhances the sound according to the location of the sound source.

18. The electronic device as claimed in claim 15, wherein the interface is a touch panel or a button.

19. An audio refocusing method, comprising:
receiving an indication signal indicating which sound source in a recorded signal has to be refocused on, wherein the recorded signal is a multimedia signal comprising an image portion and an audio portion;
determining a direction of the sound source or a location of the sound source; and
enhancing a sound generated by the sound source in the recorded signal according to the direction or the location of the sound source to generate a processed signal,
wherein the generation of the processed signal includes refocusing the audio portion of the sound source in the multimedia signal without referring to refocus result of the image portion of the sound source.

20. The method as claimed in claim 19, wherein the recorded signal is an audio signal or a multimedia signal, and wherein the audio signal or an audio portion of the multimedia signal is captured by a microphone array comprising N microphones, wherein N is a positive integer and is greater than 1.

21. The method as claimed in claim 20, wherein the microphone array captures sounds in N channels, and wherein information regarding the sounds captured in the N channels are all preserved in the recorded signal.

22. The method as claimed in claim 19, wherein the direction or the location of the sound source is determined by analyzing an acoustic feature of the sound source or an image of the sound source.

23. The method as claimed in claim 19, wherein when the sound source is a moving object, the method further comprises:
tracking a movement of the sound source according to a tracking signal, an acoustic feature of the sound source or an image of the sound source.

24. The method as claimed in claim 20, wherein the enhancing step further comprises:
determining timing differences for the N microphones to receive the sound generated by the sound source according to the direction or the location of the sound source;
adjusting sounds captured by the N microphones in the recorded signal according to the timing differences; and
summing up the adjusted sounds to generate the processed signal.

25. The method as claimed in claim 20, wherein the enhancing step further comprises:

determining whether a distance from the microphone array to the sound source is greater than a predetermined value; and when the distance is greater than the predetermined value, enhancing the sound according to the direction of the sound source, and when the distance is not greater than the predetermined value, enhancing the sound according to the location of the sound source.

* * * * *